United States Patent
Krome et al.

(10) Patent No.: US 12,296,840 B2
(45) Date of Patent: *May 13, 2025

(54) METHOD AND APPARATUS FOR PRESENTING A FEEDFORWARD CUE IN A USER INTERFACE BEFORE AN UPCOMING VEHICLE EVENT OCCURS

(71) Applicant: HERE GLOBAL B.V., Eindhoven (NL)

(72) Inventors: Sven Krome, Berlin (DE); Jerome Beaurepaire, Berlin (DE); Francesco Grani, Berlin (DE); Vasileios Bosdelekidis, Berlin (DE)

(73) Assignee: HERE Global B.V., Eindhoven (NL)

( * ) Notice: Subject to any disclaimer, the term of this patent is extended or adjusted under 35 U.S.C. 154(b) by 500 days.

This patent is subject to a terminal disclaimer.

(21) Appl. No.: 17/321,059

(22) Filed: May 14, 2021

(65) Prior Publication Data
US 2021/0276585 A1 Sep. 9, 2021

Related U.S. Application Data

(63) Continuation of application No. 16/203,248, filed on Nov. 28, 2018, now Pat. No. 11,014,577.

(51) Int. Cl.
*B60W 50/14* (2020.01)
*B60W 50/00* (2006.01)
*G05D 1/00* (2024.01)

(52) U.S. Cl.
CPC ........ *B60W 50/14* (2013.01); *B60W 50/0098* (2013.01); *G05D 1/0088* (2013.01);
(Continued)

(58) Field of Classification Search
CPC ............ A61B 5/18; B60R 1/00; B60W 30/09; B60W 30/18154; B60W 40/08;
(Continued)

(56) References Cited

U.S. PATENT DOCUMENTS 8,930,139 B2 1/2015 Goddard
9,091,561 B1 * 7/2015 Weir .................. G01C 21/3484
(Continued)

FOREIGN PATENT DOCUMENTS

DE 102005043838 A1 * 3/2007 ............ B60W 40/09
DE 102014112077 A1 2/2016
(Continued)

*Primary Examiner* — Stephen R Burgdorf
(74) *Attorney, Agent, or Firm* — DITTHAVONG, STEINER & MLOTKOWSKI

(57) ABSTRACT

An approach is provided for presenting a feedforward cue in a user interface before an upcoming vehicle event occurs. The approach involves retrieving map data covering an upcoming area in which a vehicle is to travel. The approach also involves extracting a feedforward cue from the map data, wherein the feedforward cue preemptively indicates an upcoming vehicle event that can have an effect on an experience that a user has while engaged in a non-driving activity in the vehicle. The approach further involves providing data for presenting the feedforward cue in a user interface before the upcoming vehicle event occurs.

12 Claims, 14 Drawing Sheets

(52) U.S. Cl.
CPC ............... *B60W 2050/0012* (2013.01); *B60W 2050/143* (2013.01)

(58) Field of Classification Search
CPC .. B60W 50/0098; B60W 50/14; B60W 50/16; B60W 60/00133; B60W 60/0051; B60W 2050/0012; B60W 2050/143; G01C 21/3697; G05D 1/0022; G05D 1/0088; G05D 2201/0213; G06Q 1/096811; G06Q 10/00; G10L 15/18
USPC ...................................................... 340/425.5
See application file for complete search history.

(56) References Cited

U.S. PATENT DOCUMENTS

| | | | |
|---|---|---|---|
| 9,868,332 B2 | 1/2018 | Anderson et al. | |
| 2002/0194016 A1* | 12/2002 | Moribe | G08G 1/096725 701/469 |
| 2008/0042813 A1* | 2/2008 | Wheatley | B60Q 9/008 340/439 |
| 2014/0309806 A1* | 10/2014 | Ricci | G05D 23/1917 701/1 |
| 2015/0233722 A1* | 8/2015 | Faaborg | G01C 21/3626 340/995.27 |
| 2016/0228771 A1 | 8/2016 | Watson | |
| 2017/0313326 A1 | 11/2017 | Sweeney et al. | |
| 2018/0029610 A1 | 2/2018 | McNew | |
| 2018/0082203 A1* | 3/2018 | Bender | G01C 21/3415 |
| 2018/0089901 A1 | 3/2018 | Rober et al. | |
| 2018/0141555 A1* | 5/2018 | Jung | B60L 15/20 |
| 2019/0047498 A1 | 2/2019 | Alcaidinho et al. | |
| 2019/0061655 A1 | 2/2019 | Son | |
| 2020/0114150 A1 | 4/2020 | Monteiro | |

FOREIGN PATENT DOCUMENTS

| | | | | |
|---|---|---|---|---|
| EP | 1554604 B1 * | 10/2006 | ............ | B60Q 9/008 |
| WO | 2017053359 A1 | 3/2017 | | |

* cited by examiner

100

METHOD AND APPARATUS FOR PRESENTING A FEEDFORWARD CUE IN A USER INTERFACE BEFORE AN UPCOMING VEHICLE EVENT OCCURS

RELATED APPLICATION

This application is a continuation of U.S. patent application Ser. No. 16/203,248, filed Nov. 28, 2018, entitled "METHOD AND APPARATUS FOR PRESENTING A FEEDFORWARD CUE IN A USER INTERFACE BEFORE AN UPCOMING VEHICLE EVENT OCCURS," which is incorporated herein by reference in its entirety.

BACKGROUND

Autonomous vehicles are able to operate by using pattern based learning and by processing data from sensors and other sources to support logical decision making (i.e., calculating the probabilities of various scenarios and upcoming vehicle events). However, passengers of such vehicles conducting non-driving activities, such as reading, eating, etc., may experience discomfort when the vehicle performs certain driving maneuvers, such as making a sharp turn. Accordingly, service providers face significant technical challenges to minimize the discomfort caused by these driving maneuvers by autonomous vehicles.

SOME EXAMPLE EMBODIMENTS

As a result, there is a need for presenting a feedforward cue in a user interface before an upcoming vehicle driving maneuver event occurs.

According to one embodiment, a computer-implemented method comprises retrieving map data covering an upcoming area in which a vehicle is to travel. The method also comprises extracting a feedforward cue from the map data, wherein the feedforward cue preemptively indicates an upcoming vehicle event that can have an effect on an experience that a user has while engaged in a non-driving activity in the vehicle. The method further comprises providing data for presenting the feedforward cue in a user interface before the upcoming vehicle event occurs.

According to another embodiment, an apparatus comprises at least one processor, and at least one memory including computer program code for one or more computer programs, the at least one memory and the computer program code configured to, with the at least one processor, cause, at least in part, the apparatus to retrieve map data covering an upcoming area in which a vehicle is to travel. The apparatus is also caused to extract a feedforward cue from the map data, wherein the feedforward cue preemptively indicates an upcoming vehicle event that can have an effect on an experience that a user has while engaged in a non-driving activity in the vehicle. The apparatus is further caused to provide data for presenting the feedforward cue in a user interface before the upcoming vehicle event occurs.

According to another embodiment, a non-transitory computer-readable storage medium carries one or more sequences of one or more instructions which, when executed by one or more processors, cause, at least in part, an apparatus to retrieve map data covering an upcoming area in which a vehicle is to travel. The apparatus is also caused to extract a feedforward cue from the map data, wherein the feedforward cue preemptively indicates an upcoming vehicle event that can have an effect on an experience that a user has while engaged in a non-driving activity in the vehicle. The apparatus is further caused to provide data for presenting the feedforward cue in a user interface before the upcoming vehicle event occurs.

According to another embodiment, an apparatus comprises means for retrieving map data covering an upcoming area in which a vehicle is to travel. The apparatus also comprises means for extracting a feedforward cue from the map data, wherein the feedforward cue preemptively indicates an upcoming vehicle event that can have an effect on an experience that a user has while engaged in a non-driving activity in the vehicle. The apparatus further comprises means for providing data for presenting the feedforward cue in a user interface before the upcoming vehicle event occurs.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for visualizing upcoming vehicle events to passengers of autonomous vehicles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
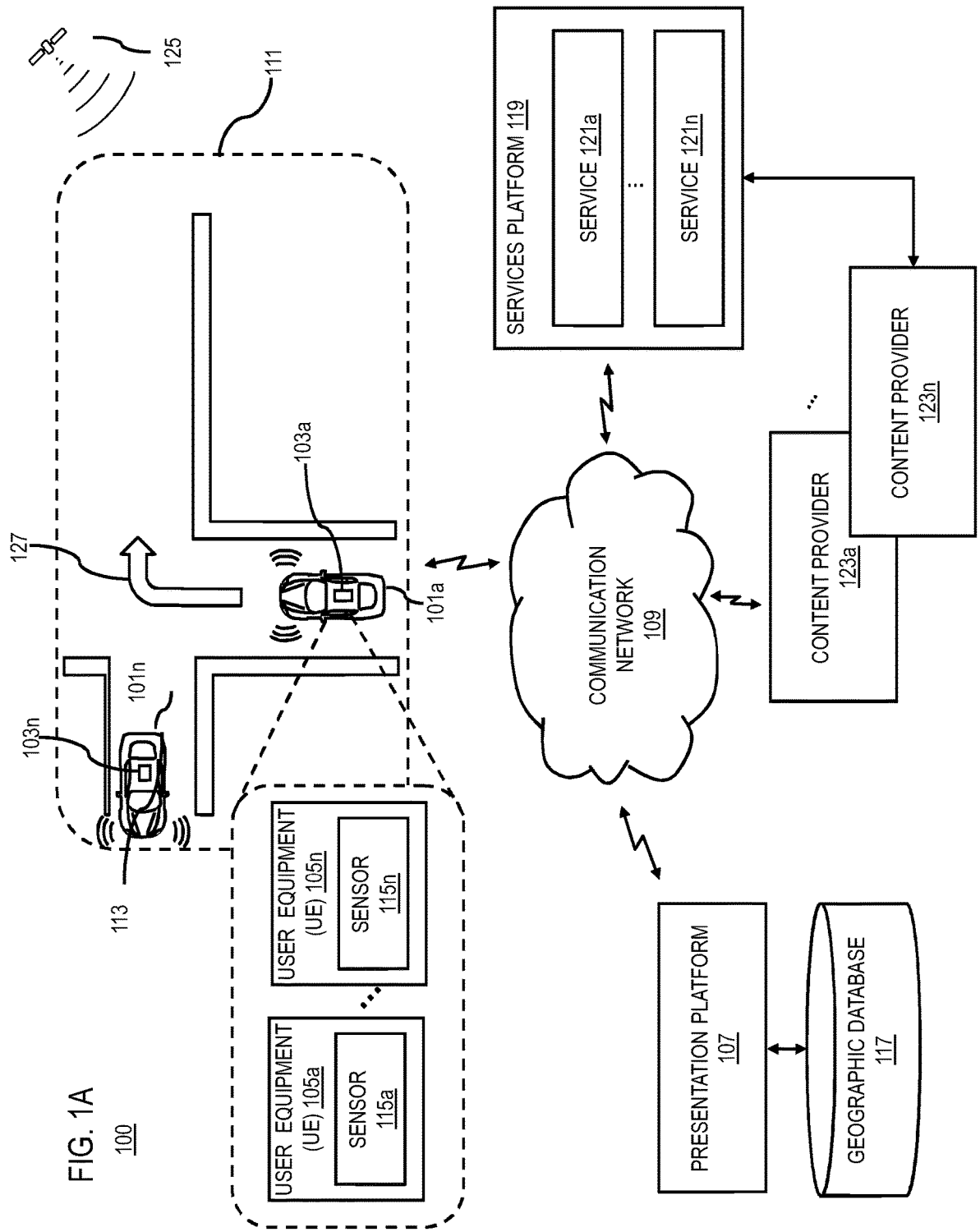
FIG. 1A is a diagram of a system capable of presenting a feedforward cue in a user interface before an upcoming vehicle event occurs, according to one embodiment.

FIG. 1A is a diagram of a system capable of presenting a feedforward cue in a user interface before an upcoming vehicle event (e.g., of an autonomous or semi-autonomous car) occurs, according to one embodiment. As discussed above, autonomous vehicles can operate using pattern-based learning and by processing data from sensors and other sources to support logical decision making. Although such vehicles can calculate the probabilities of various scenarios and upcoming vehicle events, they are still not able to prepare passengers for certain driving maneuvers that can affect user experience while engaging in a non-driving activity in the vehicle. The driving maneuvers may include, for instance, turning at corners, making speed changes for road varieties, avoiding road hazards, etc. For example, organizations developing the vehicles apply traditional approaches to decrease motion sickness via providing feedback from car sensors (e.g. gyro or accelerators). However, the feedback systems are not effective, since they do not provide early enough cues/alters for the passengers to respond emotionally and/or physically to the driving maneuvers. In addition, the feedback systems require real-time calculation of sensor data which taxes on computation and communication resources.

Many people feel discomfort due to unable to observe their surroundings and provide for a sense of anticipation when they are performing non-driving activities inside an autonomous or semi-autonomous vehicle (e.g., a car). This discomfort is like the discomfort that regular passengers often feel when they are in a vehicle driven by someone else, or when they are in an airplane, train, bus, etc. When it comes to travel, vision is by far the most dominant sense used by most passengers, particularly passengers who are new to autonomous driving. Vision, for instance, enables passengers to observe their surroundings and provide for a sense of anticipation.

Anticipation can guide decisions and helps passengers to prepare for something yet to happen. Humans can identify and imagine potential threats and situations that then lead to proactive actions. For example, such a scenario could occur when a passenger sees a 90 degree turn approaching and she/he reacts to the turn by leaning against the turn direction of the vehicle that she/he is riding within.

When an upcoming or future driving maneuvers event is presented to a passenger in an understandable format (i.e., they "see" the future), the passenger can anticipate the event, and be both physically and mentally prepared for the event (e.g., adapting the non-driving activities accordingly). Providing such future information in a way that can be timely and easily perceived by passengers can present significant technical challenges, particularly in dynamic driving or other travel environments that can change quickly.

To address these technical problems, a system 100 of FIG. 1A introduces a capability to present a feedforward cue in a user interface to indicate the potential effects of an upcoming maneuver on some user non-driving activity (e.g., engaged within the vehicle) before the upcoming vehicle event occurs, according to one embodiment. In one embodiment, the feedforward cue can be associated with a cue location or cue delivery point in digital map data (e.g., map data of a geographic database 117) to indicate at what location the system 100 can either present data to the user or take actions based on anticipated experiential effects on a non-driving activity or to indicate upcoming navigational maneuvers that may affect the non-driving activity. In one embodiment, the system 100 also provides for personalization of the cue delivery point or location based, for instance, on individual driving characteristics (e.g., speed, user preferences, etc.) that may alter when or where a feedforward cue is to be delivered. By way of example, the cue locations can be determined and stored based on heuristics of allocating cue sequences (e.g., when, where, and how often to deliver a feedforward cue to reduce potential effects, such as motion sickness, on a non-driving activity, such as reading, occurring in the vehicle). In one embodiment, the system 100 then aligns the feedforward cues to occur or be delivered according to a progress or development of a maneuver. In other words, an individual maneuver can be broken down into sub-maneuvers so that cues can be aligned with the sub-maneuvers. For example, in making a right turn the first maneuver can include a braking segment followed by a turning segment which each sub-maneuver having different potential effects on the non-driving activity. In yet another embodiment, the cues can include both feedforward cues (e.g. pre-maneuver cues) and feedback cues. Feedback cues are cues presented at a map location after to the maneuver to indicate that potential effects of the maneuver on non-driving activities are likely to be over.

In other words, the embodiments of the system 100 described herein, for instance, advantageously enable a presentation of feedforward cues that were computed beforehand via sensor data, route geometry, etc. and stored in map data for quick retrieval at a later time to allow drivers or passengers to prepare for the upcoming driving maneuvers and/or its effects on non-driving activity without having to compute the potential effects of the maneuver in real-time or when the maneuver is beyond the sensor range of a vehicle's onboard systems. In one example use case, the system 100 determines, for instance, that a navigation route of the vehicle is to take a right turn at an upcoming area (e.g., a four-way interaction), and a speed profile at the four-way interaction is an average of 15 mile per hour (Mph) for making the right turn. The system 100 extracts feedforward cues corresponding to an upcoming 15-Mph right turn to present to the passengers. The feedforward cues, for instance, can indicate that the upcoming right turn may result in a lateral acceleration force sufficient to induce motion sickness while reading. On being presented with such a cue, the user or passenger can, for instance, be instructed to pause reading for a certain period of time (e.g., until the completion of the maneuver) to avoid motion sickness. In one embodiment, the system 100 can present a feedback cue after the vehicle completes the right turn to indicate that the user can resume reading without having to worry about the potential for motion sickness.

In another embodiment, the system 100 translates map data into experiential and navigational cues by calculating a probability that the vehicle will take at a cue location before the four-way interaction. The map data was assembled from sensor data, contextual data, or a combination thereof during operations of a plurality of vehicles. By way of example, the vehicles (e.g., vehicles 101) may be autonomous or semi-autonomous vehicles (e.g., cars, buses, scooters, etc.). In one embodiment, the vehicles could be any means of transportation where a passenger is not in control (e.g., an airplane, a train, a ferry, etc.).

In one embodiment, the map data can include high resolution (HD) map with traffic/weather/incident map data that have submeter/centimeter level accuracy or better to enable map data based autonomous driving applications (e.g., which typically require high accuracy map data). The map data can be combined with historical data for the same geographic areas of interest (e.g., the upcoming area in which a vehicle is expected to drive). The historical data, for instance, comprises data collected on vehicle drives or trajectories (e.g., vehicle probe data representing historical travel data as a sequence of time-ordered vehicle and heading measurements), corresponding user activities (e.g., reading, moving watching, sleeping, etc.) taking place during the drives, and/or other related data (e.g., weather, visibility, etc. at the time of the drive). In this way, according to one embodiment, the feedforward cues determined from the map data can be generated based on historical activity data, historical travel data, or a combination thereof collected from the upcoming area.

In one embodiment, the system 100 can determine the upcoming maneuver or area of interest for a vehicle based on any means. For example, if the user has entered a destination into a navigation system, the predicted route can be used to determine what upcoming geographic are or road segment is coming next. Then the feedforward cues stored in the map data of the upcoming area can be used. In another example, if a destination is not determined, the system 100 can use historical data to determine a probability that the vehicle 101 will make a certain maneuver. For example, the system 100 can calculate a probability/) to indicate what maneuver among different maneuvers a vehicle 101 is likely to take. By way of example, the probability I) can be a joint probability distribution or matrix for parameters X, Y, Z, . . . . that gives the probability that each of X, Y, Z, . . . falls in any particular range or discrete set of values specified for that variable. For example, X can be an average speed profile parameter (e.g., three out of four times that vehicles with an average speed of 15 Mph made a right turn and one out of four times that the vehicles with an average speed of 45 Mph drove straight via), Y is a is a personal reaction time parameter (e.g., 5 minutes), and Z is a maneuver distance parameter (e.g., 200 feet).

In one embodiment, the calculated probability can then be used to determine which maneuver and/or to personalize the maneuver based on the individual parameters. For example, as discussed above, the system 100 can dynamically personalize a stored feedforward cue to the individual driving characteristic of the vehicle 101 (e.g., speed) and/or user (e.g., reaction time) of interest. If the vehicle is traveling at higher speeds that the default speed profile at which the stored feedforward cue is determined, the system 100 can adjust the stored cue delivery location to occur earlier than indicated in the stored record, so that the user will have the same relatively time for advance notification. Similarly, if the user's reaction time is less than the average used for calculating the stored cue delivery location, the system 100 can make an equivalent adjustment or personalization to move the cue delivery location farther in advance of the corresponding vehicle event or maneuver to provide more time for advance notification.

The system 100 presents the feedforward cues before the upcoming vehicle event occurs, for example, in an audio interface and/or a visual interface with an two dimensional (2D), three dimensional (3D), augmented reality (AR), and/or a virtual reality (VR) view inside a vehicle, such as on a window (e.g., a vehicle windshield, a heads-up display, etc.) or in a display (e.g., a handheld display such as a mobile phone or an integrated dashboard or headrest display).

In one instance, the user interface could also be a goggle or an eyeglass device used separately or in connection with a mobile device. In one embodiment, the system 100 can present or surface the feedforward cues and/or feedback cues in multiple interfaces simultaneously (e.g., presenting a 2D map, a 3D map, an AR view, a VR display, or a combination thereof). In one instance, the system 100 can present the feedforward cues and/or feedback cues through multiple interfaces within the vehicle based on the location or positioning of the passengers (e.g., a windshield for passengers in the front seats and on side windows for passengers in the back seats). In one embodiment, the system 100 could also present the feedforward cues and/or feedback cues to a passenger through one or more sounds. For example, the system 100 could produce the feedforward cues and/or feedback cues through the speakers of the vehicle. By way of example, the system 100 can move a car seat relative to the vehicle's future speed, future road conditions, etc. so that the passenger will better physically and mentally anticipate the driving maneuvers and their bodies and mind will be better "prepared."

When passengers inside of the vehicle can apprehend the upcoming vehicle event that they are approaching in advance (e.g., in a user interface of a user device, vehicle display, etc.), they can anticipate it and adapt themselves and/or the non-driving activities to prepare for the event before it occurs. This presentation of feedforward cues can help the passenger have a greater sense of anticipation and comfort that the vehicle has also recognized and planned for the same event or events that the passenger has detected visually. The greater comfort can also achieve via adaption actions of the non-driving activities that would maintain non-driving activities (e.g., enlarging the fonts on an e-book the passenger is reading when making the right turn).

In one embodiment, the system 100 can identify non-driving activities of the user via sensor data, etc. The sensor data may be collected using a sensor configured to detect a user's or passenger's gaze, heartrate, sweat rate or perspiration level, eye movement, body movement, or a combination thereof. In one instance, the body movement could include a passenger checking the tension of a child's seatbelt, grabbing a handle, bracing against the user device, or any other movements passengers may make when they are engaging in the non-driving activities. For example, the system 100 could track the eyes of a passenger (e.g., focusing at a child in the vehicle) to determine the type/kind of non-driving activities the user is engaging as tending the child.

The contextual data may include, for example, mapping or route information, etc., passenger location and/or positioning within the autonomous vehicle, object movement information (e.g., static versus moving), status information (e.g., traffic light status, construction status, etc.), time of day, weather conditions, visibility, historical data, etc. In one embodiment, the system 100 collects the sensor data, contextual data, or a combination through one or more sensors such as camera sensors, light sensors, Light Imaging Detection and Ranging (Lidar) sensors, Radio Detection and Ranging (Radar), infrared sensors, thermal sensors, and the like, to determine the type/kind of the non-driving activities.

In one embodiment, the system 100 processes the sensor data, the contextual data, or a combination thereof to determine the kind/type of the non-driving activities. The non-driving activities of the user may be independent from a user device, such as eating, reading a book, tending to children, sleeping, applying make-up, etc. The non-driving activities of the user may be performed on the user device, such as making or receiving a call, writing or sending messages/posts/comments, taking pictures, browsing internet, recording videos, watching movies, reading a book or e-book, gaming, VR use, etc. The feedforward cues can be extracted from the map data based on a relevance factor of the feedforward cues to the non-driving activities.

Further, the map data further includes a feedback cue that indicates an end of the upcoming driving maneuvers, and the duration of the upcoming driving maneuvers is determined based on a feedback cue location of the feedback cue. The system 100 receives a user feedback with respect to the adapting of the user, the vehicle, and/or the device to mitigate the effect on the user experience. For example, the system 100 receives a user feedback that the feedforward cue of "leaning left when the vehicle turning right" does not help with attending a child since the child does not read and/or follow the feedforward cue. The system 100 modifies the feedforward cue based on the user feedback, by displaying an avatar leaning left to induct the child to follow.

The presentation of the feedforward cues to a passenger by the system 100 is helpful because when the passenger(s) inside of the autonomous vehicle can prepare for an event (e.g., a driving maneuver) in advance the upcoming vehicle event that they are approaching, they will anticipate it and hence their minds will be "prepared." The system 100, for instance, in addition to providing an audio and/or visual representation, can also provide a passenger with a recommendation of actions to adapting the non-driving activities to counter the effects of the upcoming vehicle event (e.g., the system 100 can suggest the user to tilt the device in coordination with the prediction of the upcoming vehicle event to minimize the effects on the user's viewing of a movie on the device from the user's point of view). It is important to understand the psychological limits of each passengers (e.g., how far in the future a passenger normally anticipates and prepares), especially since humans react differently to different events.

In one embodiment, to predict an upcoming vehicle event (e.g., a driving maneuver), the system 100 extracts from map data collected during historical vehicle operations (e.g., autonomous and/or semi-autonomous cars) to save real-time computation and communication resources. For example, in one embodiment, the system 100 can make this prediction by using Electronic Horizon technology which translates map information (e.g., HD map data of the geographic database 117) with detailed road characteristics into actionable data for advanced driver assistance systems (ADAS) (e.g., embedded into vehicles or other mobile devices), making ADAS more reliable and extending their awareness beyond sensor limits (e.g., extend several hundred meters, several kilometers, etc. beyond the sensor range of current conventional vehicle sensors). Electronic Horizon technology, for instance, uses ingested map data to calculate a vehicle's most probable, as well as alternative paths, and provides it to the ADAS unit combined with a set or road and map attributes. When used in combination with HD maps (e.g., digital map data with submeter or centimeter level accuracy), these predictions and resulting actionable data (e.g., data indicating or used for indicating specific actions or maneuvers the vehicle is perform based on knowledge of upcoming events and map data).

In one embodiment, the upcoming vehicle event includes an autonomous maneuver that the vehicle is predicted to take in response to a road geometry, such as a curve, a predicted driving maneuver of the vehicle (assuming the object is moving), or a combination thereof. By way of example, the upcoming vehicle event may include the autonomous vehicle performing any one of the following actions or maneuvers: passing another vehicle, turning at an intersection, turning at or entering a complex intersection or interchange (e.g., a roundabout or an offramp), making a U-turn, parallel parking, or a combination thereof. Similarly, the upcoming vehicle event may also include one or more nearby vehicles (e.g., a large truck) performing one or more of the same maneuvers. By way of example, the system 100 can process the map data through aggregation, one or more machine learning approaches, filtering area(s) of interest (e.g., field of view, line of sight, on route, distance), or a combination thereof.

In one embodiment, the system 100 extracts the feedforward cues from the map data based on a relevance factor of the feedforward cue to the non-driving activities, such as reading a book, playing a videogame, or interacting with a personal device. In one embodiment, the relevance factor may be determined by the system 100 based on heuristics of allocating cue sequences taken from researches. The determined relevance factor is important because the goal of the system 100 is not to force passengers of autonomous vehicles to suspend the non-driving activities, but to adapt the non-driving activities.

In one embodiment, the system 100 can then present feedforward cues and/or feedback cues based on the one or more specified parameters. By way of example, a parameter can include a time duration (e.g., 5 seconds, 10 seconds, 20 seconds, etc.), a starting time (e.g., a user initiated starting time or a starting time determined by the system 100 based on data of the feedforward cues and/or feedback cues), a time direction (e.g., forwards or backwards), starting direction, etc. or a combination thereof. Following the examples described above, the system 100 can present feedforward cues and/or feedback cues for a user on a train, or an airplane, or a boat, for example, before a sudden braking, rapid dip or rise in altitude, or change of course/heading, respectively. In one embodiment, the feedforward cues and/or feedback cues can be based on vehicle telemetry data where other traditional means of recording past events (e.g., recorded video) to conserve real-time consumption of system resources by pre-processing and storing feedforward cues and/or feedback cues in the map data.

By way of example, the user interface and/or the user interface element could also include in addition to or instead of a knob or roller ball-based interface, a pressure sensor on a screen or window whose intensity reflects the movement of time, an interface that enables gestures/touch interaction, an interface that enables voice commands, pedals or paddles of the autonomous vehicle, or a combination thereof. In one embodiment, the system 100 and the user interface element, e.g., a joystick, enable a passenger to leave feedback for the effectiveness of the feedforward cues.

In one embodiment, the user interface element (e.g., a knob, a roller or trackball-based interface, etc.) may also be used by a passenger to control the presentation of feedforward cues and/or feedback cues. In one instance, a passenger can use the interface element to control and manipulate the visualization of the feedforward cues and/or feedback cues over time (i.e., "playing with the time") by varying colors, styles, screen positions, etc. the cues in a variety of increments (e.g., 5 second, 10 second, 20 second). In one embodiment, a passenger may also tailor the presentation to her/his interests, for example, presenting only one feedforward cue, multiple feedforward cues, for a specific time period of the future, or based on a relevance factor of the prediction (i.e., until a threshold value based on time and context is met). In one embodiment, the system 100 or the passenger could organize the cue presentations in the user interfaces based on a relevance (e.g., more concerning upcoming vehicle events being presented on the windshield or a heads-up display and feedforward cues/upcoming vehicle events of less interest being presented on side windows).

In one embodiment, after the system 100 visualizes or surfaces the feedforward cues and/or feedback cues to the one or more passengers, the system 100 identifies whether the user acknowledged the event and if any reaction the user had to the visualization, the driving maneuvers, or the combination thereof. By way of example, the system 100 can determine that a given situation/intersection/maneuver has a high relevant factor with a non-driving activity either implicitly (e.g., through researches, such as brain reading technology, monitoring physical changes such as increasing heart rate, pulse, adrenaline levels, breathing patterns, etc.) or explicitly (e.g., user surveys, etc.). Using the information, the system 100 can better understand how the situation/intersection/maneuver affect the user's non-driving activities.

In one embodiment, the system 100 can enable the user to modify the operation of the vehicle in response to the driving maneuvers (e.g., by interacting with the user interface element). By way of example, a user may decide to let the vehicle pass the four-way intersection instead of making a right turn to make her/him feel less motion sickness. Given the number of passengers in the example of a plane, train, ferry, etc. the possibility of letting the user to modify the operation of the vehicle may be less likely; however, if the system 100 detected that a majority of the passengers shared the same preference, then the users may be able to collectively influence the operations of a plane, a train, a ferry, etc. much like a single user would influence some of the decisions of an autonomous car. This could be done by a simple interface (e.g., a roller track ball or a mobile device, or a voice command) that helps slowing down the vehicle at a given future location. The system 100's ability to letting the user to modify the operation of the vehicle recognizes that not all passengers share the same preference, relevant factor, or even desire to participate in the operation decisions of an autonomous vehicle.

As shown in FIG. 1A, the system 100 comprises one or more vehicles 101*a*-101*n* (also collectively referred to herein as vehicles 101) configured with one or more vehicle sensors 103*a*-103*n* (also collectively referred to herein as vehicle sensors 103), one or more user equipment (UE) 105*a*-105*n* (also collectively referred to herein as UEs 105) having connectivity to a presentation platform 107 via a communication network 109. In one embodiment, the vehicles 101 are autonomous vehicles or highly assisted driving vehicles that can sense their environments and navigate within a travel network 111 without driver or occupant input. In one embodiment, one or more passengers are riding within the vehicle 101*a*. Although the vehicles 101 are depicted as automobiles, it is contemplated the vehicle 101 may be an any type of transportation wherein a passenger is not in control (e.g., an airplane, a train, a ferry, etc.). In one embodiment, the vehicle sensors 103 (e.g., camera sensors, light sensors, Lidar sensors, radar, infrared sensors, thermal sensors, and the like) acquire map data during an operation of the vehicle 101 along one or more roads 113 within the travel network 111. By of example, the map data may include mapping or route information, and optionally traffic status information (e.g., traffic light status, construction status, etc., time of day, weather conditions, visibility information, historical data, etc.). In one embodiment, the vehicle sensors 103 can determine passenger location and or positioning within the vehicle 101 and whether a passenger is engaging in any non-driving activities.

In one embodiment, the UEs 105 can be associated with any of the types of vehicles or a person or thing traveling within the travel network 111. By way of example, the UE 105 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 105 can support any type of interface to the user (such as "wearable" circuitry, etc.). In one embodiment, the one or more vehicles may have cellular or wireless fidelity (Wi-Fi) connection either through the inbuilt communication equipment or from the UE 105 associated with the vehicles 101. Also, the UEs 105 may be configured to access a communication network 109 by way of any known or still developing communication protocols. In one embodiment, the UEs 105 include a user interface element configured to receive a user input (e.g., a knob, a joystick, a rollerball or trackball-based interface, a touch screen, etc.). In one embodiment, the user interface element could also include a pressure sensor on a screen or a window (e.g., a windshield of a vehicle 101, a heads-up display, etc.) whose intensity reflects the movement of time, an interface element that enables gestures/touch interaction by a user, an interface element that enables voice commands by a user, or a combination thereof. In one embodiment, the UEs 101 may are configured with various passenger sensors 115a-115 (also collectively referred to herein as passenger sensors 115) for collecting passenger sensor data during an operation of the vehicle 101 along one or more roads 113 within the travel network 111. By way of example, the passenger sensors 115 are any type of sensor that can detect a passenger's gaze, heartrate, sweat rate or perspiration level, eye movement, body movement, or combination thereof, in order to determine whether a passenger is engaging in a non-driving activity, etc.

In one embodiment, the vehicles 101 also have connectivity to a presentation platform 107 over the communication network 109. In one embodiment, the presentation platform 107 performs the process for presenting a feedforward cue in a user interface before an upcoming vehicle event occurs as discussed with respect to the various embodiments described herein. In one embodiment, the presentation platform 107 can be a cloud-based platform that collects and processes sensor data from sensors 103 and 115, contextual data regarding the passengers and the vehicle 101's surroundings, or a combination thereof. In one embodiment, the presentation platform 107 can be a standalone server or a component of another device with connectivity to the communication network 109. For example, the component can be part of an edge computing network where remote computing devices (not shown) are installed along or within proximity of the travel network 111. In one embodiment, the presentation platform 107 performs functions related to generating mapping data (e.g., location-based records) related to static objects proximate to the vehicle 101 (e.g., vehicles, pedestrians, traffic lights, etc.) and correlates them to geographic areas described in a geographic database 117. In one embodiment, the presentation platform 107 has connectivity over the communication network 109 to the services platform 119 (e.g., an OEM platform) that provides one or more services 121a-121n (also collectively referred to herein as services 121) (e.g., sensor data collection services). By way of example, the services 121 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, content providers 123a-123n (collectively referred to as content providers 123) may provide content or data (e.g., including geographic data, parametric representations of mapped features, historical data, etc.) to the geographic database 117, the presentation platform 107, the services platform 119, the services 121, and the vehicles 101. The content provided may be any type of content, such as map content, contextual content, audio content, video content, image content, etc. In one embodiment, the content providers 123 may also store content associated with the geographic database 117, presentation platform 107, services platform 119, services 121, and/or vehicles 101. In another embodiment, the content providers 123 may manage access to a central repository of data, and offer a consistent, standard interface to data, such as a repository of the geographic database 117.

By way of example, as previously stated the vehicle sensors 103 may be any type of sensor. In certain embodiments, the vehicle sensors 103 may include, for example, a global positioning sensor for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., for detecting objects proximate to the vehicle 101a), an audio recorder for gathering audio data (e.g., detecting nearby humans or animals via acoustic signatures such as voices or animal noises), velocity sensors, and the like. In another embodiment, the vehicle sensors 103 may include sensors (e.g., mounted along a perimeter of the vehicle 101) to detect the relative distance of the vehicle from lanes or roadways, the presence of other vehicles (e.g., vehicle 101n), pedestrians, animals, traffic lights, road features (e.g., curves) and any other objects, or a combination thereof. In one scenario, the vehicle sensors 103 may detect weather data, traffic information, or a combination thereof. In one example embodiment, the vehicles may include GPS receivers to obtain geographic coordinates from satellites 125 for determining current location and time. Further, the location can be determined by a triangulation system such as A-GPS, Cell of Origin, or other location extrapolation technologies when cellular or network signals are available. In another example embodiment, the one or more vehicle sensors 103 may provide in-vehicle navigation services.

The communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the presentation platform 107 may be a platform with multiple interconnected components. By way of example, the presentation platform 107 may include multiple servers, intelligent networking devices, computing devices, components and corresponding software for determining upcoming vehicle events for one or more locations based, at least in part, on signage information. In addition, it is noted that the presentation platform 107 may be a separate entity of the system 100, a part of the services platform 119, the one or more services 121, or the content providers 123.

In one embodiment, the geographic database 117 stores information on road links (e.g., road length, road breadth, slope information, curvature information, etc.), probe data for one or more road links 113 (e.g., traffic density information), and historical accident data associated the road links 113 or other geographic areas within the travel network 111. The information may be any of multiple types of information that can provide means for triggering vehicle sensor activation based on proximate object detection. In another embodiment, the geographic database 117 may be in a cloud and/or in a vehicle 101 (e.g., an autonomous car) and/or a mobile device (e.g., a UE 105).

By way of example, the vehicles 101, the UEs 105, the presentation platform 107, the services platform 119, and the content providers 123 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
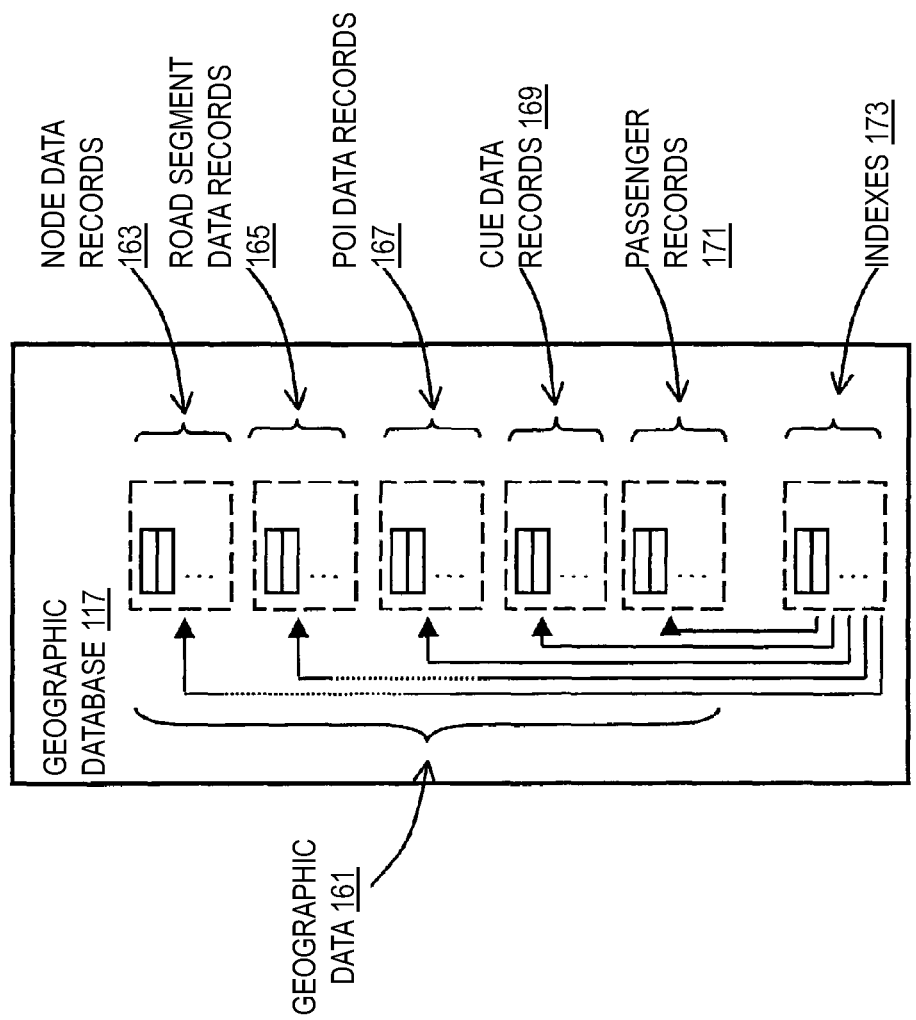
FIG. 1B is a diagram of a geographic database of the system of FIG. 1A, according to one embodiment.

FIG. 1B is a diagram of the geographic database 117 of the system 100, according to exemplary embodiments. In the exemplary embodiments, contextual data, upcoming vehicle event data, feedforward cues and/or feedback cues, relevance data, confidence data, etc. can be stored, associated with, and/or linked to the geographic database 117 or data thereof. In one embodiment, the geographic or map database 117 includes geographic data 161 used for (or configured to be compiled to be used for) mapping and/or navigation-related services, such as for location-based triggering of vehicle sensors 103 as discussed in the various embodiments described herein. The geographic data 161 can also be used for personalized route determination, according to exemplary embodiments. For example, the geographic database 117 includes node data records 163, road segment or link data records 165, POI data records 167, feedforward cues and/or feedback cues 169, anonymized passenger records 171, and indexes 173 for example. More, fewer or different data records can be provided. In one embodiment, the additional data records (not shown) can include cartographic ("carto") data records, routing data, and maneuver data. In one embodiment, the indexes 173 may improve the speed of data retrieval operations in the geographic database 117. For example, the indexes 173 may be used to quickly locate data without having to search every row in the geographic database 117 every time it is accessed.

In exemplary embodiments, the road segment data records 165 are links or segments representing roads (e.g., road 113 of the travel network 111), streets, parking areas, or paths, as can be used in the calculated route or recorded route information for determination of one or more personalized routes, according to exemplary embodiments. The node data records 163 are end points corresponding to the respective links or segments of the road segment data records 165. The road link data records 165 and the node data records 163 represent a road network or travel network 111, such as used by vehicles, cars, and/or other entities. Alternatively, the geographic database 117 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 117 can include data about the POIs and their respective locations in the POI data records 167. The geographic database 117 can also include data about places, such as cities, towns, or other communities, and other geographic features, such as bodies of water, mountain ranges, etc. Such place or feature data can be part of the POI data 167 or can be associated with POIs or POI data records 167 (such as a data point used for displaying or representing a position of a city).

In one embodiment, the geographic database 117 also includes cue data records 169. For example, a cue data record 169 may specify a set of feedforward cues and/or feedback cues associated with one or more upcoming driving maneuvers mapped to a cue node or link (e.g., a curvature) of the geographic data 161. The feedforward cues and/or feedback cues can be further specified by mode of transport (e.g., bus, vehicle, scooter, etc.). In this way, the cue data record 169 can provide information based on an averaged vehicle speed profile occurring at the cue node/location (e.g., intersection 127 of FIG. 1A). In addition, the cue data record 169 can indicate a sequence of upcoming driving maneuvers mapped to the node or link of the geographic data for the system 100 to present an upcoming vehicle event to the passenger sooner when approaching the cue node/location.

In one embodiment, the geographic database 117 also includes passenger records 171. By way of example, a passenger record 171 may include a personal reaction time mapped to an upcoming driving maneuver and/or a non-driving activity. In one embodiment, the passenger record 171 can be used by the system 100 to dynamically adjust the cue node/location based on the personal reaction time with respect to the upcoming driving maneuver and/or the non-driving activity.

In one embodiment, the passenger records 171 are anonymized by excluding user identification data therefrom, and the system 100 uses other user profile and/or context data to determine a personal reaction time for a passenger. In one embodiment, the user profile data includes, but not limited to, age, birthplace, genetic information (e.g., gender, race, etc.), marriage status, criminal records, activity records, employment status, medical status, political and non-political affiliations, preferences (e.g., POIs), calendar data, driving history data, vehicle sharing data, etc. of the user. In one embodiment, the user context data includes, but not limited to, a destination of the user, a type of the destination of the user, a proximity of the user location the destination, availability of an alternate destination for the user, a number of passengers accompanying the user, weather data in the vicinity of the user, etc.

The geographic database 117 can be maintained by the content provider 123 in association with the services platform 119 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database 117 or data in the master geographic database 117 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as a navigation system of the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 117 can be a master geographic database, but in alternate embodiments, the geographic database 117 can represent a compiled navigation database that can be used in or with end user devices (e.g., vehicles 101, UEs 105) to provide navigation-related functions or location-based functions (e.g., triggering vehicle sensor activation based on objects such as a second vehicle crossing the path and route of the vehicle 101a). For example, the geographic database 117 can be used with the vehicle 101 to provide an end user with navigation features. In such a case, the geographic database 117 can be downloaded or stored in a navigation system of the vehicle 101, or the vehicle 101 can access the geographic database 117 through a data connection over the communication network 109, for example.

Figure 2:
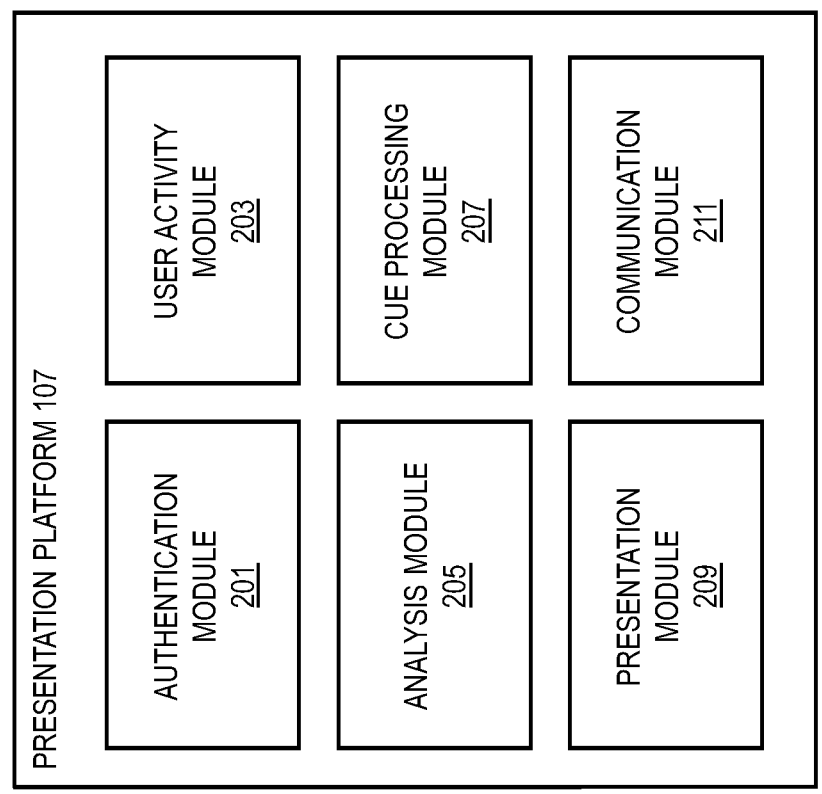
FIG. 2 is a diagram of the components of a presentation platform, according to one embodiment.

FIG. 2 is a diagram of the components of a presentation platform 107, according to one embodiment. By way of example, the presentation platform 107 includes one or more components for presenting a feedforward cue in a user interface before an upcoming vehicle event occurs (e.g., an autonomous vehicle). It is contemplated that the functions of these components may be combined in one or more components or performed by other components of equivalent functionality. In one embodiment, the presentation platform 107 includes an authentication module 201, a user activity module 203, an analysis module 205, a cue processing module 207, a presentation module 209, and a routing module 211. The above presented modules and components of the presentation platform 107 can be implemented in hardware, firmware, software, or a combination thereof. Though depicted as a separate entity in FIG. 1A, it is contemplated that the presentation platform 107 may be implemented as a module of any of the components of the system 100. In another embodiment, the presentation platform 107 and/or one or more of the modules 201-211 may be implemented as a cloud-based service, local service, native application, or combination thereof. The functions of the presentation platform 107 and the modules 201-211 are discussed with respect to FIGS. 3-6 below.

In one embodiment, the authentication module 201 authenticates UEs 101 and/or associated vehicles 103 for interaction with the presentation platform 107. By way of example, the authentication module 201 receives a request to access the presentation platform 107. The request may be submitted to the authentication module 201 via the communication module 209, which enables an interface between the UEs 101 and/or associated vehicles 103 and the presentation platform 107. In addition, the authentication module 201 may provide and/or validate access by the UE 101 to upload sensor data, trajectory data, and/or other location-based information to the presentation platform 107. In one embodiment, the authentication module 201 may further be configured to support and/or validate the formation of profile by a provider of a service or content provider, e.g., for supporting integration of the capabilities for presenting a feedforward cue in a user interface before an upcoming vehicle event occurs with the service or content provider.

In one instance, the sensor data may be collected by the sensors 115 and sent to the user activity module 203 to determine a user non-driving activity within the vehicle via analyzing passenger location and/or positioning with the vehicle (e.g., the vehicle 101a), time of day, a user's or a passenger's gaze, heartrate, sweat rate or perspiration level, eye movement, body movements (e.g., hand gestures, jaw movements, head motions, arm/fingers movements, etc.), weather conditions, or a combination thereof. By way of example, the sensors 115 could include camera sensors, light sensors, Lidar sensors, radar, infrared sensors, thermal sensors, brain reading technology, a blood pressure cuff, a fingertip pulse oximeter and heart rate monitor, an eye tracking device, or a combination thereof. For example, the user activity module 203 could determine that a passenger is grabbing a child, checking the tension of a child car seatbelt, pushing against the dashboard or any other movements suggesting that the passenger is attending a child.

The analysis module 205 processes the map data to predict an upcoming vehicle event that can have an effect on an experience that a user has while engaged in the non-driving activity in the vehicle. As described above, presenting a feedforward cue that preemptively indicates the upcoming vehicle event can prepare the passengers physically and mentally for the upcoming vehicle event, to reduce the passenger's discomfort created by the upcoming vehicle event, and/or to minimize impact on the user's non-driving activity by the upcoming vehicle event. By way of example, the upcoming vehicle event could include when a user attending a child while a vehicle (e.g., vehicle 101n) approaching an intersection and making a right turn, which may cause the passenger and the child to lean towards the right side of the vehicle as to, for example, spill the juice the passenger is feeding the child. In one instance, the upcoming vehicle event may include an autonomous maneuver that the vehicle (e.g., vehicle 101a) is predicted to take in response to an object (e.g., a four-way stop sign, etc.), a predicted movement of the vehicle (e.g., making a right turn following a navigation route), or a combination thereof. For example, the upcoming vehicle event may include the vehicles 101 performing any of the following actions of maneuvers: stopping at a traffic sign, speeding up to merge onto a highway, turning at an intersection, turning at or entering a complex intersection or interchange (e.g., a roundabout or an offramp), making a U-turn, parallel parking, or a combination thereof.

In one embodiment, the map data including cues is retrieved by the system 100 from a third party provider. In another embodiment, the map data is aggregated by the system 100 by processing the sensor data, the contextual data, or a combination thereof from a plurality of vehicles, and then generates the cues through one or more machine learning approaches, category filtering (e.g., field of view, line of sight, on route, distance, etc.), or a combination thereof.

In one embodiment, the system 100 generates the cues for each type of driving maneuver, assigns a series of experiential cues, and aligns the cue with at least one stage of a vehicle maneuver. For example, each vehicle maneuver has a set of cue points that are classified as feedforward cues (FFWD cues) and/or feedback cues (FB Cues). The cue points may be set as mandatory or optional.

Figure 3:
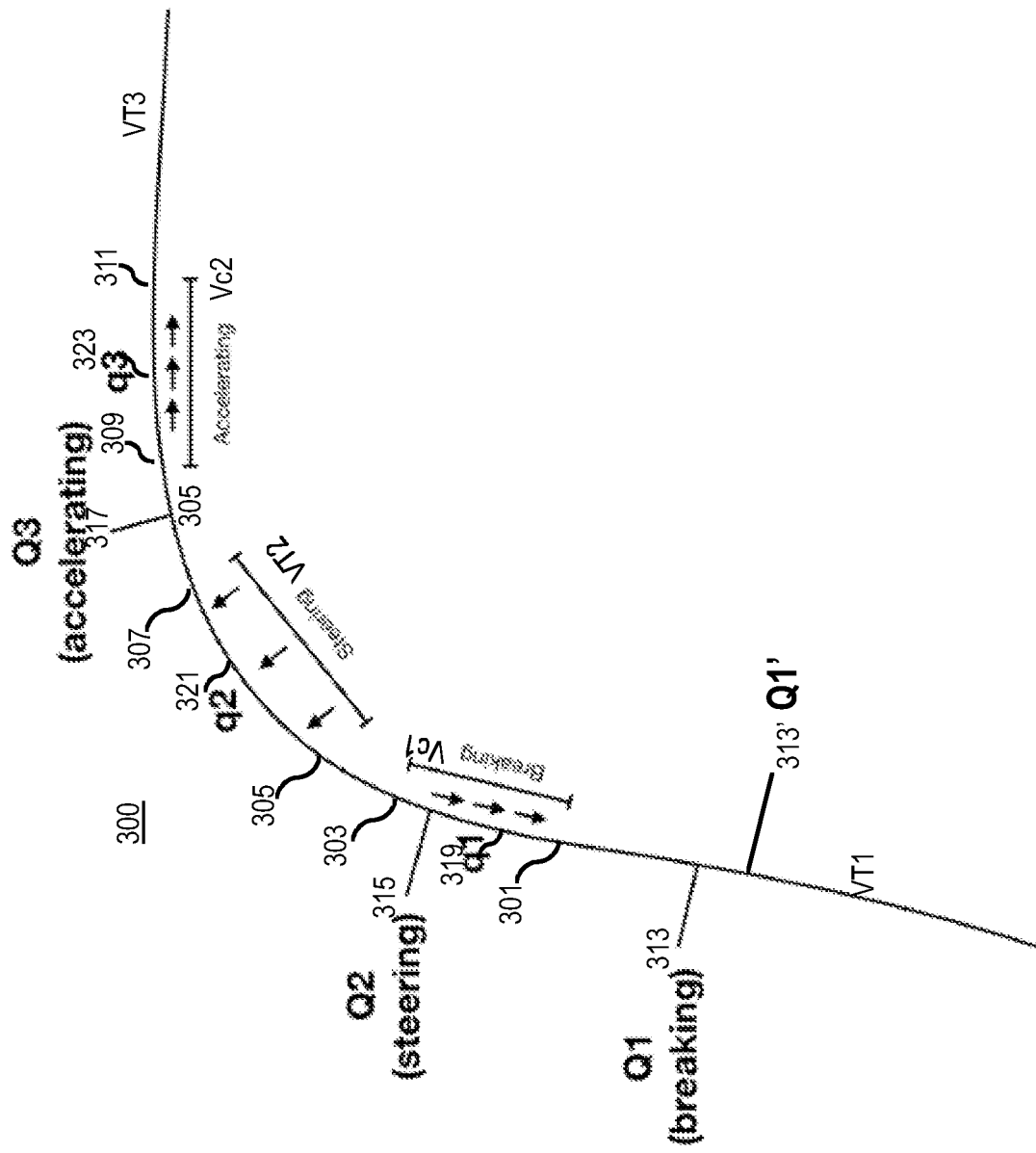
FIG. 3 is a diagram of a road geometry placed with cues to be presented in a user interface before an upcoming vehicle event occurs, according to one embodiment.

In another embodiment, the system 100 places the cues on a road geometry in relation to a speed profile of the map data. FIG. 3 is a diagram of a road geometry 300 placed with cues to be presented in a user interface before an upcoming vehicle event occurs, according to one embodiment. For example, the right turn involves a breaking maneuver, a steering maneuver, and an accelerating maneuver. Before the steering maneuver, the vehicles operates at an average speed VT1. The breaking maneuver starts at a breaking starting location 301 and ends at a breaking end location 303 on the road geometry 300 at an average breaking decelerating speed Vc1. The steering maneuver starts at a steering starting location 305 and ends at a steering end location 307 on the road geometry 300 at an average speed VT2. The accelerating maneuver starts at an accelerating starting location 309 and ends at an accelerating end location 311 on the road geometry 300 at an average accelerating speed Vc2. after the accelerating maneuver, the vehicles operates at an average speed VT3.

In one embodiment, the cue processing module 207 aligns each feedforward cue with at least one stage of the vehicle maneuver, and triggers the feedforward cue during the vehicle maneuver, based on a feedforward cue location. Referring back to FIG. 3, a feedforward cue location 313 is located before the breaking starting location 301, so the user can be presented with a feedforward cue Q1 for the breaking maneuver when the vehicle reaches the feedforward cue location 313 (before the breaking maneuver starts). A feedforward cue location 315 is located before the steering starting location 305, so the user can be presented with a feedforward cue Q2 for the steering maneuver when the vehicle reaches the feedforward cue location 315 (before the steering maneuver starts). A feedforward cue location 317 is located before the accelerating starting location 309, so the user can be presented with a feedforward cue Q3 for the accelerating maneuver when the vehicle reaches the feedforward cue location 317 (before the accelerating maneuver starts).

In one embodiment, the cue processing module 207 triggers a feedback cue during a navigation route and/or a driving maneuver, based on a feedback cue location. In one embodiment, feedforward cues rhythmically predefine the feedback cues based on the characteristics of the maneuvers. Referring back to FIG. 3, a feedback cue location 319 is located before the breaking end location 303, so the user can be presented with a feedback cue q1 for the breaking maneuver when the vehicle reaches the feedback cue location 319 (before the breaking maneuver ends). A feedback cue location 321 is located before the steering end location 307, so the user can be presented with a feedback cue q2 for the steering maneuver when the vehicle reaches the feedforward cue location 321 (before the steering maneuver ends). A feedback cue location 323 is located before the accelerating end location 311, so the user can be presented with a feedforward cue q3 for the accelerating maneuver when the vehicle reaches the feedback cue location 323 (before the accelerating maneuver ends).

Figure 4:
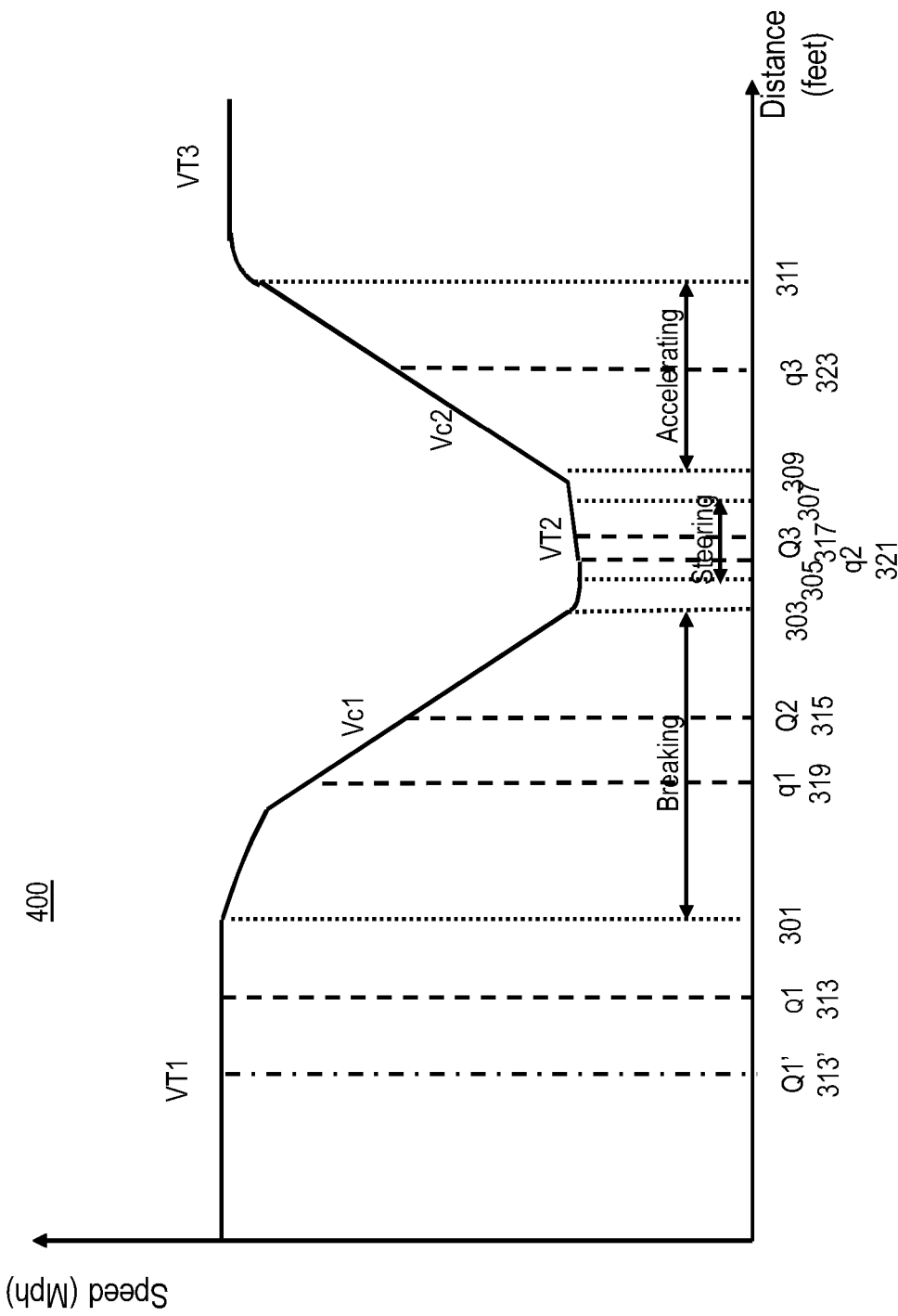
FIG. 4 is a diagram of a speed profile marked with the cues corresponding to the road geometry of FIG. 3, according to one embodiment.

FIG. 4 is a diagram of a speed profile marked with the cues corresponding to the road geometry of FIG. 3, according to one embodiment. The speed profile 400 of the road geometry 300 includes a X-axis of a distance in mile, and a Y-axis of a spend in mile per second. For example, an upcoming area (e.g., the interaction 127 in FIG. 1A) bounded by this average speed profile 400 of cars, and an average operating speed (m/sec.) with a o standard deviation of cars speeds (m/sec.). The speed profile 400 shows a vehicle operates at an average speed 45 mph, starts breaking 20 feet before the intersection to drop to 5 mph when its bumper reaches the intersection, starts steering when its bumper reaching the intersection while coasting at the speed of 5 mph, and starts accelerating when its bumper leaves the intersection to get to an average speed 45 mph.

In another embodiment, the cue processing module 207 dynamically adjusts the cue location based on a real-time context/situation, such as a speed of the vehicle, a personal reaction time of the user, a distance to the upcoming vehicle event, etc.

For example, the cue processing module 207 computes the feedforward cue location 313 for the feedforward cue Q1 based on an equation:

$$Q1(latQ1, longQ1) = A(latA, longA) - speedDiff(v, a, r)$$

Where A=a breaking starting point (latA, longA), B=a breaking end point (latB, longB), speedDiff=Calculation of a personal preferences as a feedforward factor, v=a speed of the vehicle, a=an average distance for breaking, and r=a personal reaction time For instance, when a vehicle speed is 50 mph which is faster than an average speed 45 mph before reaching the intersection, the vehicle will reach the intersection earlier so the cue processing module 207 adjusts the feedforward cue location 313 to a feedforward cue location 313' for the breaking maneuver, so the user can be presented with a feedforward cue Q1' before the breaking maneuver starts. The cue processing module 207 computes A'=an adjusted breaking starting point (latA', longA') based on an equation:

$$A'(latA', longA') = B(latB, longB) + (V_B^2 - V_A^2)/2d, \text{ where}$$
$$d = \text{acceleration factor}(+1-)$$

As another example, when a personal reaction time of the user is loner than an average personal reaction time, the cue processing module 207 adjusts the feedforward cue location 313 to a feedforward cue location 313' for the breaking maneuver, so the user can be presented with a feedforward cue Q1' earlier and sufficiently react to the cue.

The presentation module 209 presents feedforward cues in a user interface. By way of example, the user interface can include any type of UE 105 (e.g., a mobile device or an in-dash navigation display). In one embodiment, the interface includes a user interface element configured to receive a user input (e.g., a knob, a joystick, a rollerball or trackball-based interface, a touch screen, etc.) to enable a passenger to specify a parameter or the cue presentation. In one instance, the user interface could comprise a pressure sensor on a screen or a window (e.g., a vehicle windshield or heads-up display) whose intensity reflects the movement of time, an interface that enables gestures/touch interaction, an interface that enables voice commands, pedals or paddles of a vehicle (e.g., the vehicle 101*a*). In one embodiment, the presentation module 209 can present the cues to a passenger in one or more possible rendered views (e.g., 2D, 3D, AR, VR, etc.). In one embodiment, the presentation module 209 can present one or more cues on a window (e.g., a windshield or heads-up display of a vehicle 101) or in a display (e.g., a handheld display or an integrated dashboard or headrest display). In one instance, the presentation module 209 can present the cues through a goggle or eyeglass-based device used separately or in connection with a mobile device (e.g., a UE 105).

In one embodiment, the presentation module 209 can present or surface the cues of the upcoming vehicle event in multiple interfaces simultaneously (e.g., presenting an AR view on a windshield and a 2D map in a display). In one instance, the presentation module 209, in connection with the user interface, can present the cues through multiple interfaces within the vehicle (e.g., vehicle 101*a*) based on the location or positioning of the passengers (e.g., a windshield for passengers in the front seats and on side windows for passengers in the back seats). In one embodiment, the presentation module 209 can present the cues through one or more sounds. By way of example, the presentation module 209 could produce car related sounds (e.g., braking, accelerating, etc.) through the speakers of the vehicle 101. In one instance, the presentation module 209 can also present the cues to the passenger through one or more physical sensations predicted in the simulated upcoming vehicle event (e.g., moving a car seat relative to the vehicle's future speed, future road conditions, etc.).

In one embodiment, the presentation module 209, in connection with the user activity module 203, could present recommendations for preventing and/or easing discomfort to be caused by a vehicle maneuver, recommendations for adapting the non-driving activity to cope with the vehicle maneuver. For instance, these recommendations may be extracted from the map data.

In one embodiment, once the cues and/or recommendations are determined, the presentation module 209 can interact with the communication module 211 and/or the user interface to present to the user the cues. After the user selects a route option, the presentation module 209 can interact with the communication module 211 and/or the user interface to present to the user the cues based on the adjusted cue locations, related vehicle maneuver information, and/or other information related to the vehicle maneuver timing and vehicle navigation information.

It is further noted that the user interface may operate in connection with the communication module 211 to facilitate the exchange of real-time location information and/or vehicle information via the communication network 109 with respect to the services 121, content providers 123. Alternatively, the communication module 211 may facilitate transmission of the real-time location information and/or the vehicle information directly to the services 121 or content providers 123.

The above presented modules 201-211 and components of the presentation platform 107 can be implemented in hardware, firmware, software, or a combination thereof.

Figure 5:
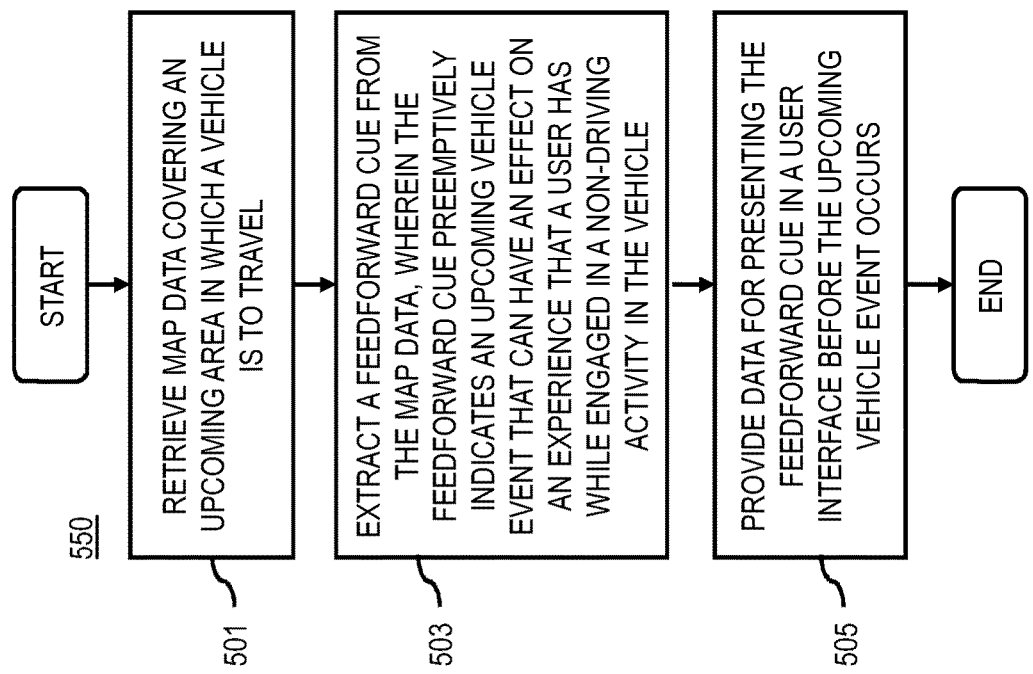
FIG. 5 is a flowchart of a process for presenting a feedforward cue in a user interface before an upcoming vehicle event occurs, according to one embodiment.
Figure 9:
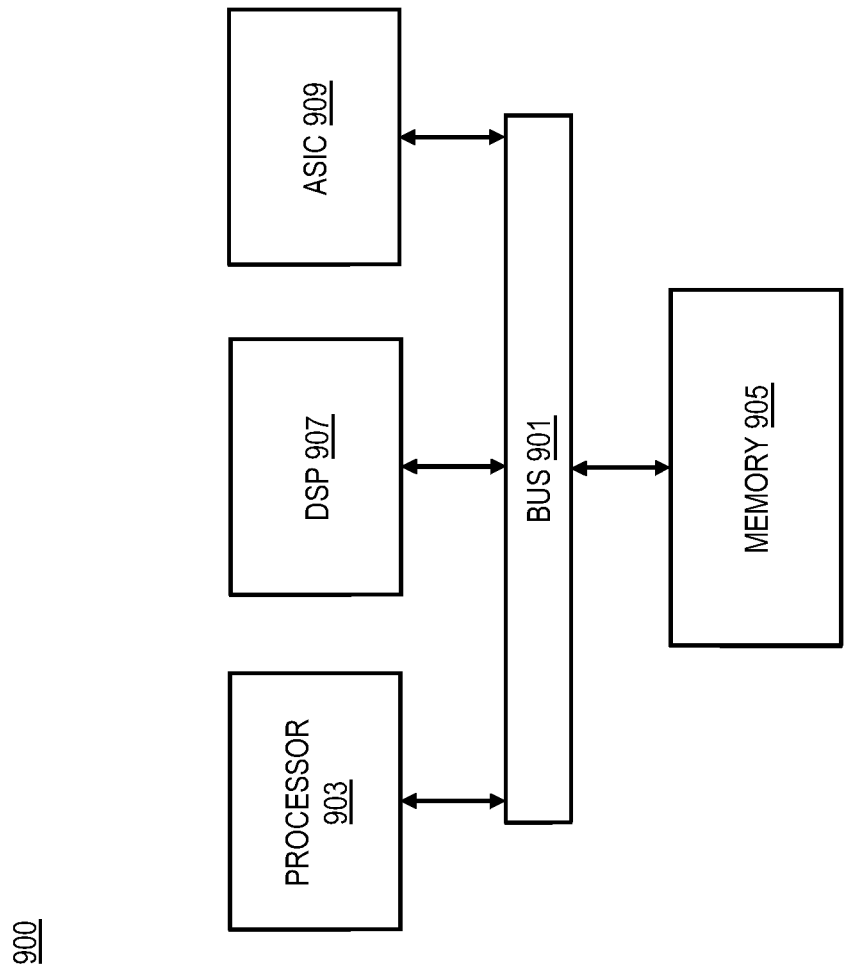
FIG. 9 is a diagram of a chip set that can be used to implement an embodiment of the invention.

FIG. 5 is a flowchart of a process for presenting a feedforward cue in a user interface before an upcoming vehicle event occurs, according to one embodiment. In various embodiments, the presentation platform 107 and/or the modules 201-211 of the presentation platform 107 as shown in FIG. 2 may perform one or more portions of the process 300 and may be implement in, for instance, a chip set including a processor and a memory as shown in FIG. 9. As such, the presentation platform 107 and/or the modules 201-211 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the presentation platform 107 retrieves map data covering an upcoming area in which a vehicle is to travel, such as the intersection 127 in FIG. 1A. In step 503, the presentation platform 107 extracts a feedforward cue from the map data. For instance, the feedforward cue preemptively indicates an upcoming vehicle event (e.g., making a right turn at the intersection 127) that can have an effect on an experience that a user has while engaged in a non-driving activity in the vehicle.

Figure 6:
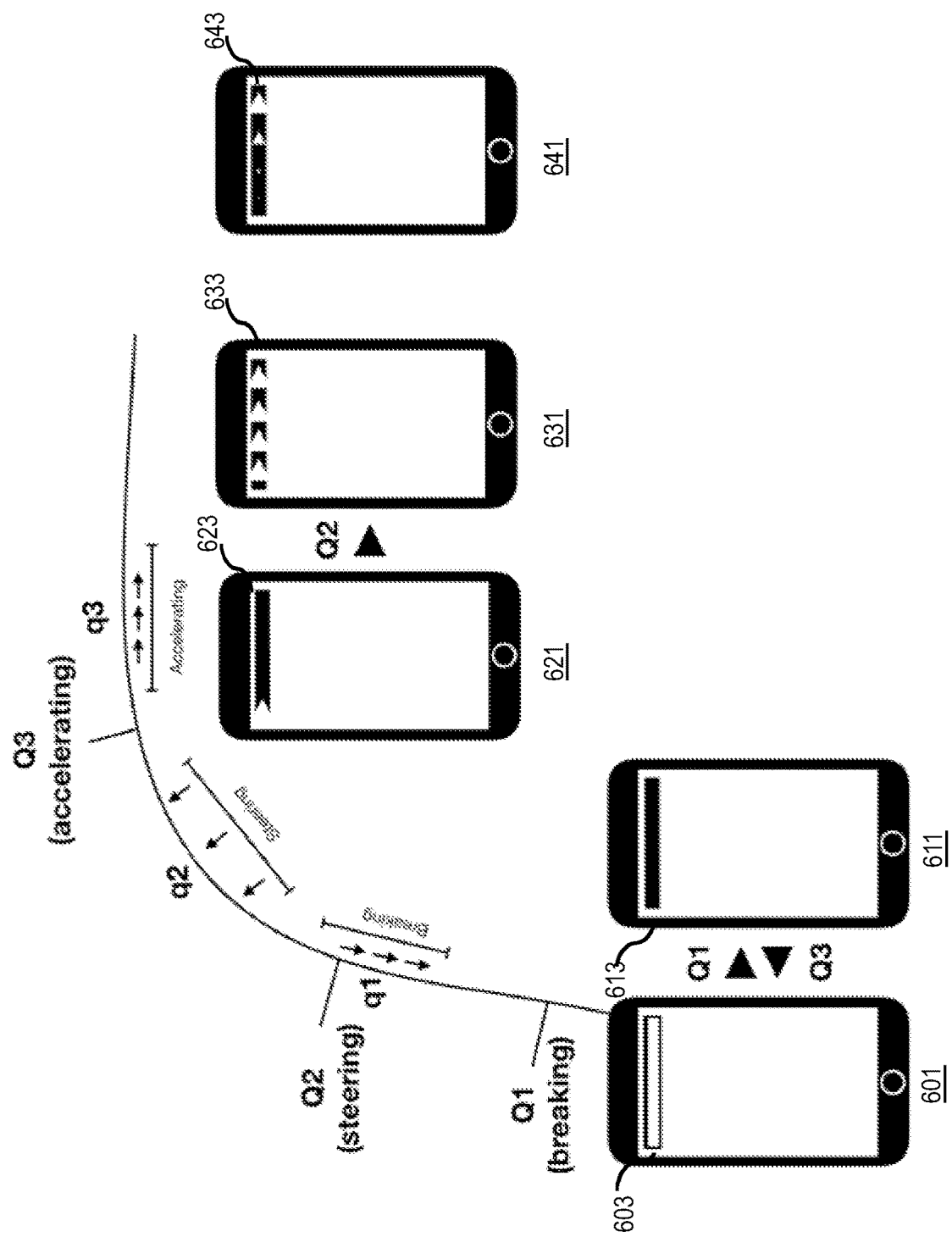
FIG. 6 is a diagram of the road geometry of FIG. 3 presented with in user interfaces depicting the cues, according to various embodiments.

In step 505, the presentation platform 107 provides data for presenting the feedforward cue in a user interface before the upcoming vehicle event occurs. FIG. 6 is a diagram of the road geometry of FIG. 3 presented with in user interfaces depicting the cues, according to various embodiments. For examples, the presentation platform 107 presents the feedforward cue Q1 for the breaking maneuver of FIG. 3 that progresses from a progress bar 603 that fills up as a visual cue for deceleration on a user interface 601 into a progress bar 613 on a user interface 611. As another example, the presentation platform 107 presents the feedforward cue Q3 for the accelerating maneuver in FIG. 3 as the progress bar 613 that empties as a visual cue for acceleration on the user interface 611 into the progress bar 603 on the user interface 601. As yet other examples, the presentation platform 107 presents the feedforward cue Q2 for the steering maneuver of FIG. 3 that progresses from a progress bar 623 that shows one arrow on a user interface 621 into a progress bar 633 that shows a sequence of arrows of an identical size indicating the steering direction on a user interface 631. As yet other examples, the presentation platform 107 presents the feedback q2 cue of FIG. 3 indicating an end of the steering maneuver of FIG. 3 that shows a progress bar 643 with arrows of different sizes (from a small size progresses to bigger sizes) on a user interface 641 that disappears in relation to the progress of steering via the right turn.

FIGS. 7A-7D are diagrams of a user interface adapted based on a feedforward cue, according to various embodiments. As shown, the user interface 700 of FIG. 7A (e.g., a UE 105 such as a mobile device) depicts a presentation of a webpage 701 browsed by the user before reaching the feedforward cue location 313 of FIG. 6. As mentioned, when reaching the feedforward cue location 313, the progress bar 603 starts filling up as a visual cue Q1 for breaking/deceleration on the user interface.

In one embodiment, the progress bar 603 and the webpage 701 are presented on the same screen. In another embodiment, the progress bar 603 and the webpage 701 are presented on two different screens. For example, the progress bar 603 is presented in a map user interface, while the webpage 701 is presented in an internet browser.

Figure 7A:
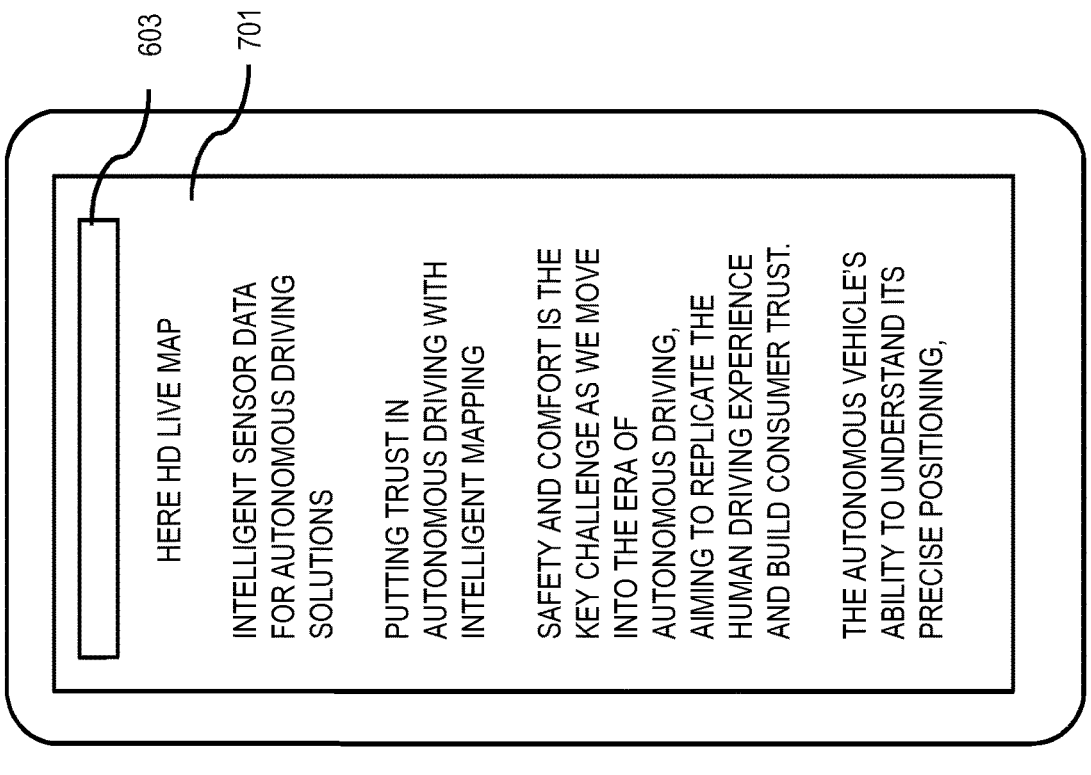
FIGS. 7A-7D are diagrams of a user interface adapted based on a feedforward cue, according to various embodiments.

Upon or after reaching the feedforward cue location 313, the presentation platform 107 adapts the user interface 700 of FIG. 7A into a different user interface for a part of the whole duration of the upcoming vehicle event (e.g., making a right turn) to mitigate the effect on the experience that the user has while engaged in a non-driving activity (e.g., browsing a webpage), via implementing various solutions for the benefit of the users. The adaption may depend on a type/nature of the upcoming vehicle event, a type/nature of the non-driving user activity, context of the vehicle, context of the user, preferences of the user, etc.

Figure 7B:
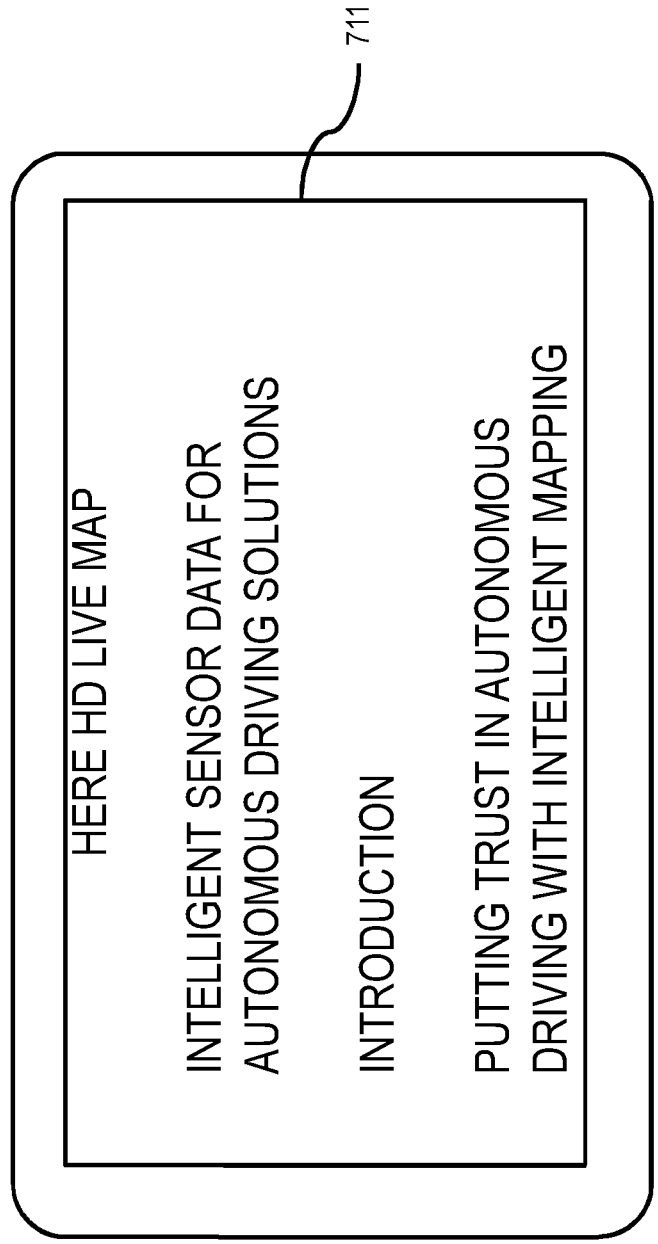

Referring back to the right-turn and webpage-browsing example, in one embodiment, the presentation platform 107 adapts the user interface 700 of FIG. 7A into a user interface 710 of FIG. 7B by turning the webpage 701 at 90 degree and enlarging the font size into a webpage 711, so the user can read better during the right turn.

Figure 7C:
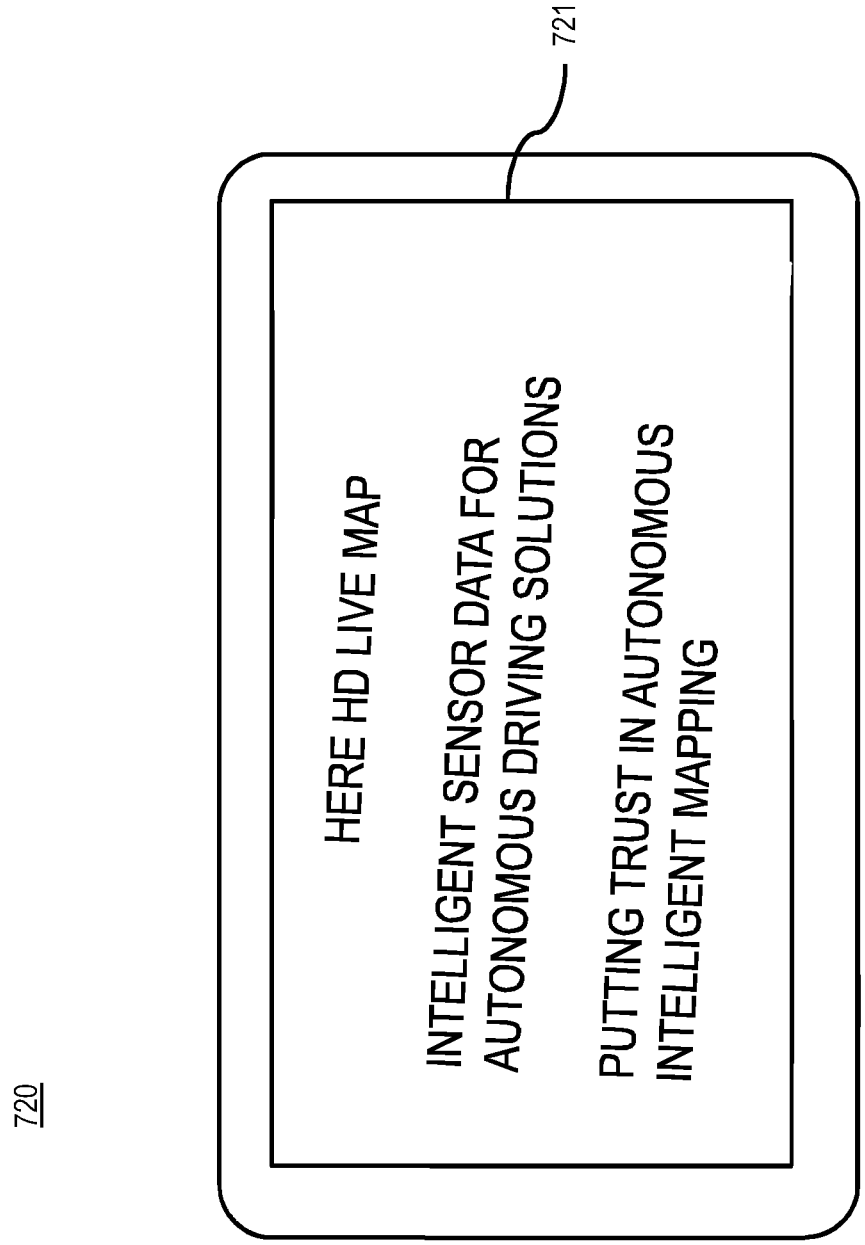
Figure 7D:
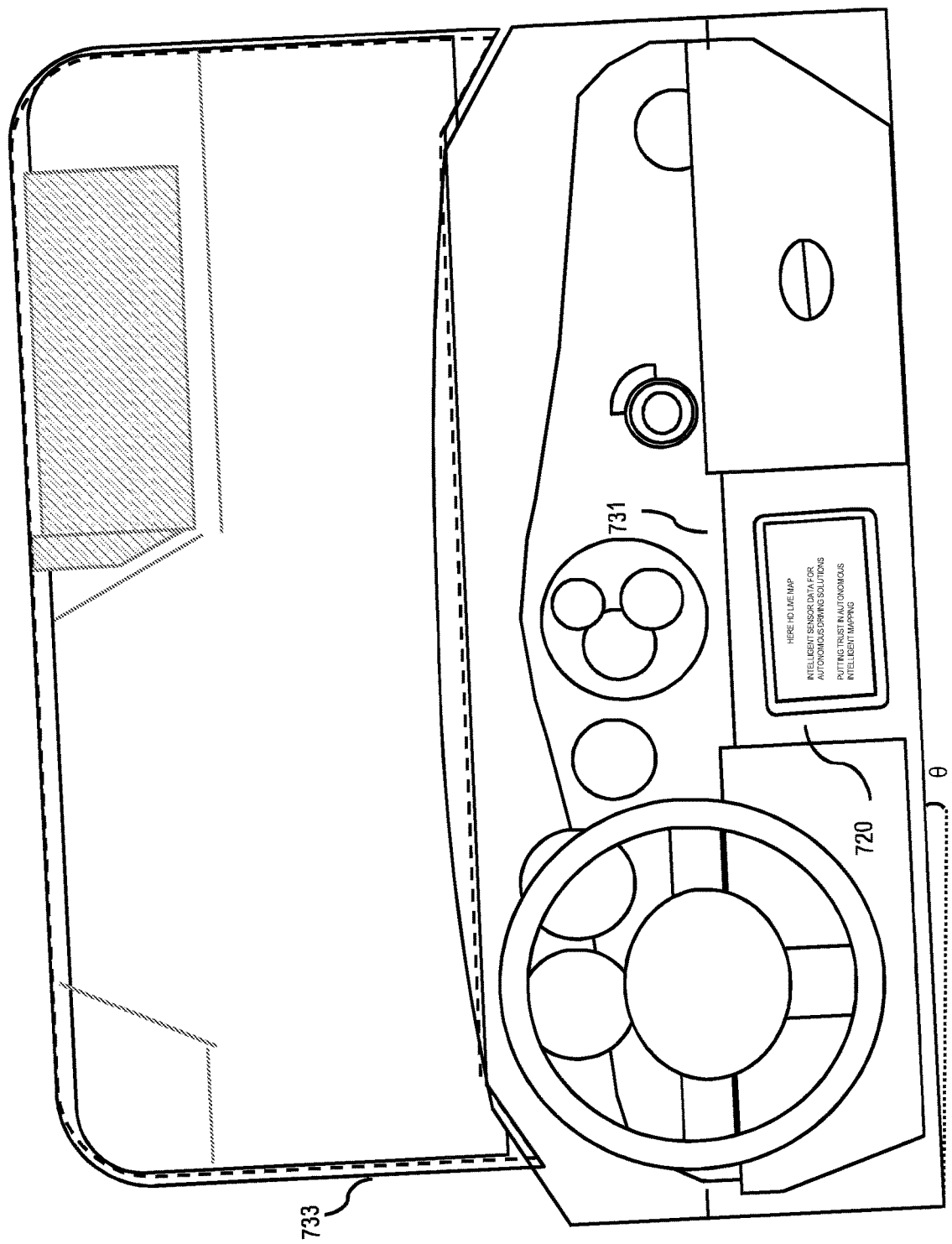

In another embodiment, the presentation platform 107 adapts the user interface 700 of FIG. 7A into a user interface 720 of FIG. 7C by tilting the webpage 701 right at an angle θ that the vehicle tilts left during the right turn, and enlarging the font size into a webpage 721, so the user can read better during the right turn. FIG. 7D depicts the user interface 720 of FIG. 7C placed on a vehicle control panel 731 below a windshield 733) depicts the words in the webpage 721 remaining horizontal during the upcoming vehicle event.

In some embodiments, the adapted user interface is presented upon reaching the feedforward cue location 313, or at any location thereafter before the end of the upcoming vehicle event, such as the feedforward cue location 315, the feedforward cue location 317, the feedback cue location 319, the feedback cue location 321, the feedback cue location 323, the starting or end of the breaking maneuver, the starting or end of the steering maneuver, the starting or end of the accelerating maneuver, etc.

In other embodiments, the adapted user interface is terminated at any location after the feedforward cue location 313 and before the end of the upcoming vehicle event, such as the feedforward cue location 315, the feedforward cue location 317, the feedback cue location 319, the feedback cue location 321, the feedback cue location 323, the starting or end of the breaking maneuver, the starting or end of the steering maneuver, the starting or end of the accelerating maneuver, etc. In another embodiments, the adapted user interface is not terminated the end of the upcoming vehicle event, if the user wishes it continues.

The computation of the different embodiments mentioned previously can be done partially or totally on servers/cloud, or at the edge of the network in order to balance the network load/cellular usage.

The above-discussed embodiments extract feedforwards and/or feedback cues from map data that are aligned with driving context (e.g., a current location and speed, etc.), and inform the passengers about upcoming vehicle events.

The above-discussed embodiments informs passengers in any vehicle preemptively about the upcoming vehicle events such as turning at a corner, speed changes for road varieties and/or hazards, etc., to prepare the passengers and reduce motion sickness or other symptoms.

The above-discussed embodiments enable the passengers to adapt their non-driving activities such as book reading, attending a child, etc. during the upcoming vehicle events, thus increasing the comfort and/or productivity inside the vehicles.

The above-discussed embodiments enable user devices to automatically adapt non-driving activities on the user devices, such as internet browsing, watching a movie, editing an article, etc. during the upcoming vehicle events.

The above-discussed embodiments allows the passengers to modify the operation of the vehicles to avoid uncomfortable situations in the vehicles.

The above-discussed embodiments lead to a higher acceptance of autonomous vehicles and their benefits.

The processes described herein for presenting a feedforward cue in a user interface before an upcoming vehicle event occurs may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
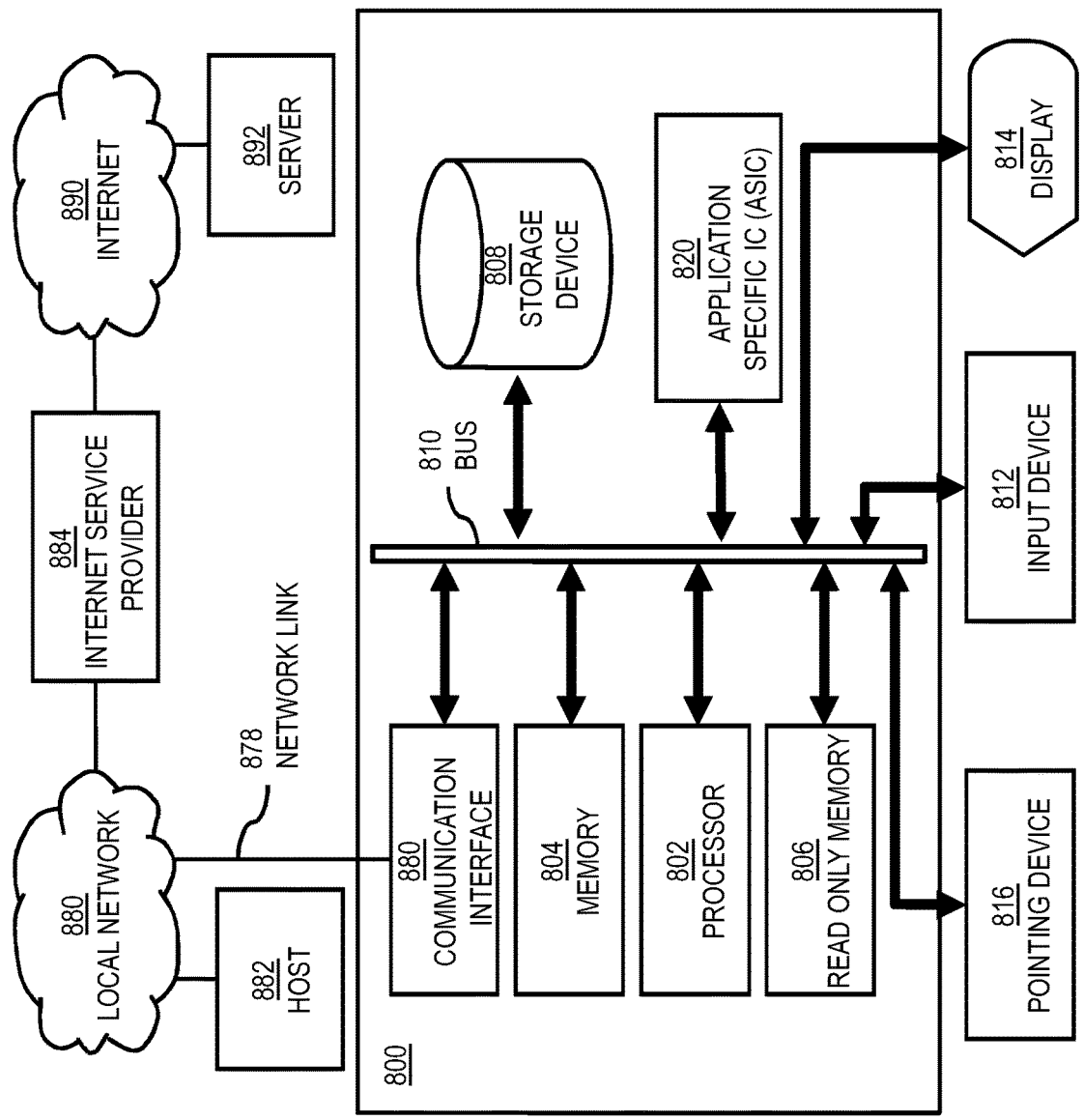
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to present a feedforward cue in a user interface before an upcoming vehicle event occurs as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions.

For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of presenting a feedforward cue in a user interface before an upcoming vehicle event occurs.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to present a feedforward cue in a user interface before an upcoming vehicle event occurs. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for presenting a feedforward cue in a user interface before an upcoming vehicle event occurs. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for presenting a feedforward cue in a user interface before an upcoming vehicle event occurs, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for presenting a feedforward cue in a user interface before an upcoming vehicle event occurs to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of presenting a feedforward cue in a user interface before an upcoming vehicle event occurs.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 905 also stores the data associated with or generated by the execution of the inventive steps.

Figure 10:
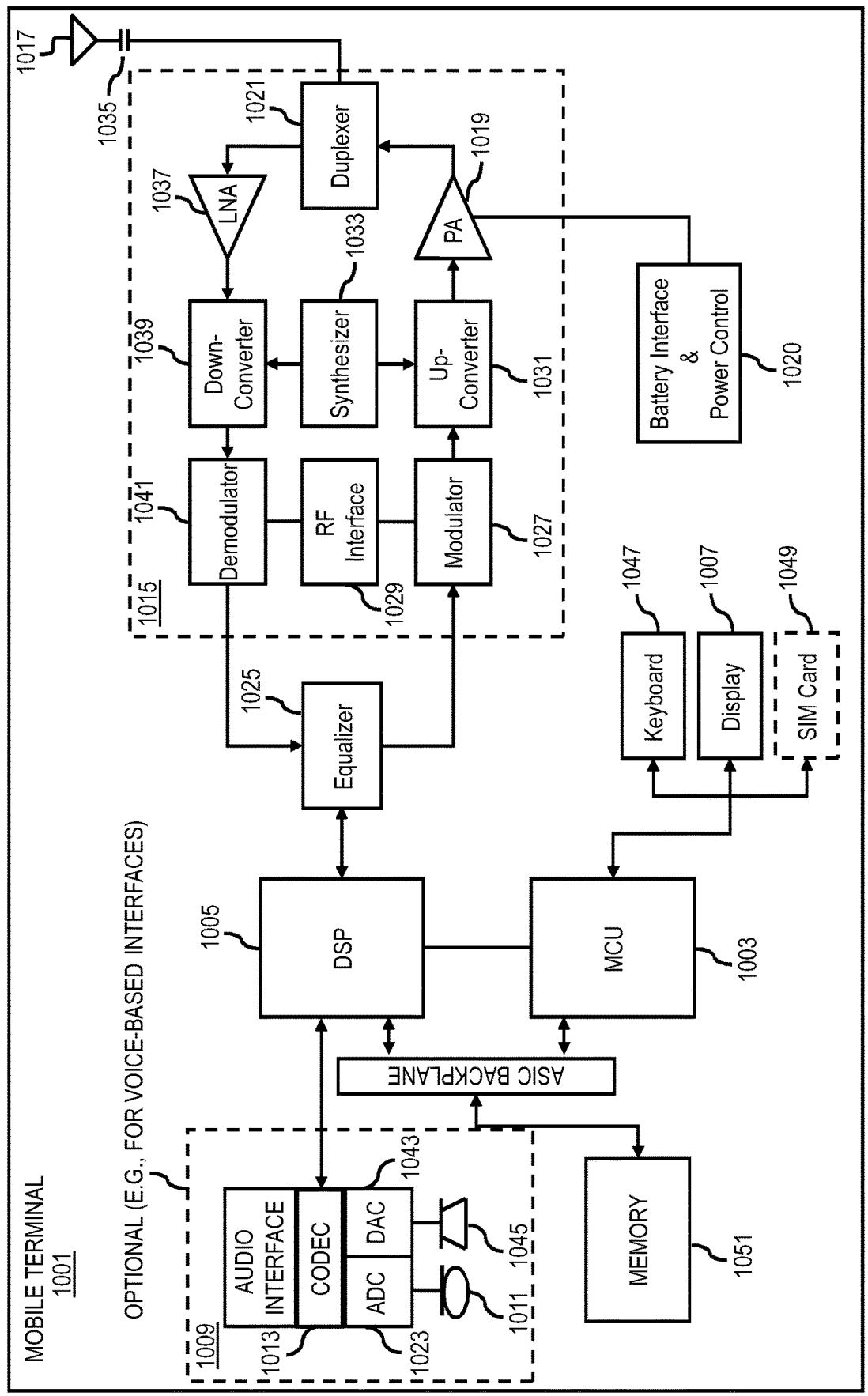
FIG. 10 is a diagram of a mobile terminal (e.g., mobile computer) that can be used to implement an embodiment of the invention.

FIG. 10 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of presenting a feedforward cue in a user interface before an upcoming vehicle event occurs. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of presenting a feedforward cue in a user interface before an upcoming vehicle event occurs. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support presenting a feedforward cue in a user interface before an upcoming vehicle event occurs is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared vehicle availability detection based on vehicle trajectory information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
    retrieving map data covering an upcoming maneuver by a vehicle;
    extracting a cue from the map data, wherein the cue indicates that the upcoming maneuver can have an effect on a non-driving activity in the vehicle; and
    causing a presentation of the cue in one or more user interfaces of either the vehicle or a device before the upcoming maneuver occurs based on detecting a location of the vehicle using a location sensor, wherein the location at which the cue is presented is dynamically adjusted based on speed of the vehicle and user's preference,
    wherein the upcoming maneuver is determined based on a probability that the vehicle will make the upcoming maneuver, and
    wherein the probability is based on a joint probability distribution or matrix for a plurality of parameters associated with the vehicle, a driver or a passenger of the vehicle, the upcoming maneuver, or a combination thereof, and
    wherein one parameter of the plurality of parameters is an average speed profile parameter of the vehicle.

2. The method of claim 1, further comprising:
    calculating the probability based on one or more vehicle trajectories indicated in historical vehicle probe data.

3. The method of claim 1, wherein one parameter of the plurality of parameters is a personal reaction time parameter of the driver or the passenger.

4. The method of claim 1, wherein one parameter of the plurality of parameters is a maneuver distance parameter of the upcoming maneuver.

5. The method of claim 1, further comprising:
personalizing the cue based on the plurality of parameters.

6. The method of claim 5, wherein the personalizing comprises adjusting a cue delivery location for the presentation of the cue based on the plurality of parameters.

7. The method of claim 1, wherein the cue is precomputed from sensor data or route geometry data and stored in the map data.

8. An apparatus comprising:
at least one processor; and at least one memory including computer program code for one or more programs, the at least one memory and the computer program code configured to, with the at least one processor, cause the apparatus to perform at least the following:
retrieve map data covering an upcoming area in which a vehicle is to travel;
extract a cue from the map data, wherein the cue indicates that an upcoming event can have an effect on a non-driving activity in the vehicle while traveling in the upcoming area; and
cause a presentation of the cue in one or more user interfaces of either the vehicle or a device before the upcoming event occurs based on detecting a location of the vehicle using a location sensor, wherein the location at which the cue is presented is dynamically adjusted based on speed of the vehicle and user's preference,
wherein the upcoming maneuver is determined based on a probability that the vehicle will make the upcoming maneuver, and
wherein the probability is based on a joint probability distribution or matrix for a plurality of parameters associated with the vehicle, a driver or a passenger of the vehicle, the upcoming maneuver, or a combination thereof, and
wherein one parameter of the plurality of parameters is an average speed profile parameter of the vehicle.

9. The apparatus of claim 8, wherein the apparatus is further caused to:
calculate a probability that the vehicle will make a maneuver, wherein the upcoming area is based on the maneuver.

10. The apparatus of claim 8, wherein the apparatus is further caused to:
calculate the probability based on one or more vehicle trajectories indicated in historical vehicle probe data.

11. A non-transitory computer-readable storage medium carrying one or more sequences of one or more instructions which, when executed by one or more processors, cause an apparatus to perform:
retrieving map data covering an upcoming maneuver by a vehicle;
extracting a cue from the map data, wherein the cue indicates that the upcoming maneuver can have an effect on a non-driving activity in the vehicle; and
causing a presentation of the cue in one or more user interfaces of either the vehicle or a device before the upcoming maneuver occurs based on detecting a location of the vehicle using a location sensor, wherein the location at which the cue is presented is dynamically adjusted based on speed of the vehicle and user's preference,
wherein the upcoming maneuver is determined based on a probability that the vehicle will make the upcoming maneuver, and
wherein the probability is based on a joint probability distribution or matrix for a plurality of parameters associated with the vehicle, a driver or a passenger of the vehicle, the upcoming maneuver, or a combination thereof, and
wherein one parameter of the plurality of parameters is an average speed profile parameter of the vehicle.

12. The non-transitory computer-readable storage medium of claim 11, wherein the apparatus is caused to further perform:
calculating the probability based on one or more vehicle trajectories indicated in historical vehicle probe data.

* * * * *